US010557204B2

(12) United States Patent
Ito

(10) Patent No.: US 10,557,204 B2
(45) Date of Patent: Feb. 11, 2020

(54) PLATED MATERIAL AND TERMINAL USING THIS PLATED MATERIAL

(71) Applicant: Yazaki Corporation, Tokyo (JP)

(72) Inventor: Yoshitaka Ito, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 286 days.

(21) Appl. No.: 15/497,557

(22) Filed: Apr. 26, 2017

(65) Prior Publication Data

US 2017/0314135 A1 Nov. 2, 2017

(30) Foreign Application Priority Data

Apr. 27, 2016 (JP) ................................ 2016-088723

(51) Int. Cl.

| | |
|---|---|
| ***B32B 15/01*** | (2006.01) |
| ***C23C 18/31*** | (2006.01) |
| ***H01R 13/03*** | (2006.01) |
| ***C25D 5/12*** | (2006.01) |
| ***C23C 28/02*** | (2006.01) |
| ***C23C 18/16*** | (2006.01) |

(52) U.S. Cl.

CPC ............ *C23C 18/31* (2013.01); *C23C 18/165* (2013.01); *C23C 18/1637* (2013.01); *C23C 28/021* (2013.01); *C23C 28/023* (2013.01); *C25D 5/12* (2013.01); *H01R 13/03* (2013.01); *Y10T 428/12896* (2015.01); *Y10T 428/12944* (2015.01)

(58) Field of Classification Search

None

See application file for complete search history.

(56) References Cited

U.S. PATENT DOCUMENTS 4,529,667 A * 7/1985 Shiga .................... B32B 15/018 205/170
5,860,513 A * 1/1999 Suzuki .................. C23C 28/021 200/268
2003/0068523 A1* 4/2003 Kaneta .................. B32B 15/018 428/670
2009/0081477 A1* 3/2009 Kobayashi ............ B32B 15/018 428/637
2010/0186993 A1* 7/2010 Yamaguchi .............. C25D 5/12 174/126.2
2015/0011132 A1* 1/2015 Shibuya ................... C25D 5/12 439/887

FOREIGN PATENT DOCUMENTS

JP 2002-317295 A 10/2002

* cited by examiner

*Primary Examiner* — Seth Dumbris
(74) *Attorney, Agent, or Firm* — Sughrue Mion, PLLC

(57) ABSTRACT

A plated material includes a base metal made from Cu or an alloy containing Cu as a main raw material, an underlayer made from Ni formed on the base metal, and an Ag plated layer formed on the underlayer. A thickness of the underlayer is 0.1 μm to 1.0 μm. A thickness of the Ag plated layer is 1.0 μm or less.

6 Claims, 8 Drawing Sheets

FIG. 3

<Potential Difference in the Combination of Elements>

| | Element | Ni | Cu | Ag |
|---|---|---|---|---|
| Element | Electrode Potential | −0.257 | 0.342 | 0.800 |
| Ni | −0.257 | | | |
| Cu | 0.342 | 0.599 | | |
| Ag | 0.800 | 1.057 | 0.458 | |

| | | | |
|---|---|---|---|
| Outer Plating | | | Ag 1 μm(65Hv) |
| Ni Underlayer | | | 0.1 μm |
| Evaluation Results | Load-Electric Resistance Characteristics | Log Scale |  |
| | | Linear Scale |  |
| | Appearance | |  |

| | | | |
|---|---|---|---|
| Outer Plating | | | Ag 1 μm(65Hv) |
| Ni Underlayer | | | 0.5 μm |
| Evaluation Results | Load-Electric Resistance Characteristics | Log Scale |   |
| | | Linear Scale |   |
| | Appearance | |   |

<table>
<tr><td colspan="3">Outer Plating</td><td>Ag 1 μm(65Hv)</td></tr>
<tr><td colspan="3">Ni Underlayer</td><td>1 μm</td></tr>
<tr><td rowspan="3">Evaluation Results</td><td rowspan="2">Load-Electric Resistance Characteristics</td><td>Log Scale</td><td>
</td></tr>
<tr><td>Linear Scale</td><td>
</td></tr>
<tr><td colspan="2">Appearance</td><td>
</td></tr>
</table>

| | |
|---|---|
| Outer Plating | Ag 1 μm(65Hv) |
| Ni Underlayer | 3 μm |

Evaluation Results

Load-Electric Resistance Characteristics

Log Scale

Linear Scale

Appearance

FIG. 8

◀ Large (easy to oxidize) — Small ( difficult to oxidize) ▶

| Metal | K | Ca | Na | Mg | Al | Zn | Fe | Ni | Su | Pb | (H) | Cu | Hg | Ag | Pt | Au |
|---|---|---|---|---|---|---|---|---|---|---|---|---|---|---|---|---|
| Reaction in Air | Rapidly Oxidized in Dry Air | | | Gradually Oxidized from Surface in Air | | | | | | | | | | DoNot oxidize | | |

PLATED MATERIAL AND TERMINAL USING THIS PLATED MATERIAL

CROSS REFERENCE TO RELATED APPLICATIONS

This application claims the priority of Japanese Patent Application No. 2016-088723, filed on Apr. 27, 2016, the entire content of which are incorporated herein by reference.

BACKGROUND

Technical Field

The present invention relates to a plated material and a terminal using this plated material.

Related Art

Vehicles such as automobiles are equipped with various electronic devices, and large numbers of electric wires and wire harnesses provided with terminals are used to supply electric power and transmit a variety of signals to these electronic devices.

In such terminals, a plated material in which Ag plating is applied to copper or a copper alloy as a base metal, for example, has been conventionally used for the purpose of reducing contact resistance, one of electrical characteristics, and improving corrosion resistance (see JP 2002-317295 A).

There has been, however, a drawback in that a plated material in which only Ag plating is applied to copper or a copper alloy is easily affected by heat.

Therefore, a structure in which an underlayer 111 made from Ni (nickel) is provided between a base metal 10 made from Cu (copper) or an alloy containing Cu as a main raw material and an Ag plated layer 112, is known in order to improve heat resistance as shown in FIG. 9A.

When a metal having a high ionization tendency is brought into contact with a metal having a low ionization tendency, galvanic corrosion (bimetallic corrosion) generally occurs.

In the above-described plated material in which Ag plating is applied to copper or a copper alloy, copper (Cu) and silver (Ag) are not easily oxidized, and moreover their ionization tendencies are relatively close (see a table of ionization tendencies shown in FIG. 8), and thus even when the two are touched, galvanic corrosion does not easily occur.

In contrast, nickel (Ni) is easily oxidized compared to copper (Cu), and electric potential difference is relatively large due to relatively different ionization tendencies (see FIG. 8). The galvanic corrosion occurs by the contact of an Ag plated layer 112 and a Ni underlayer 111, and as shown in FIG. 9A, a corrosion product ($NiO_3S$) 150 is deposited on the surface 112*b* through pinholes 112*a* in some cases.

Therefore, when this plated material is applied to a terminal, there has been a problem in that a part of the contact surface made of the surface 112*a* of the Ag plated layer 112 is covered with the corrosion product 150, an insulating substance, and contact resistance increases.

Therefore, in order to suppress the deposition of such corrosion product, a structure in which the thickness H10 of the Ag plated layer 120 is thickened to 5 μm or more is suggested as shown in FIG. 9B.

In addition, a structure in which a corrosion inhibitor (or an antitamish agent) is applied to the surface 121*b* of the Ag plated layer 121 to fill pinholes 121*a* which spontaneously exist in the Ag plated layer 121 is suggested as shown in FIG. 9C. This prevents moisture in air from touching the contact part of the Ag plated layer 121 and the Ni underlayer 111 to suppress the deposition of the corrosion product.

SUMMARY

The above-mentioned conventional techniques however have had difficulties as follows.

First, in the structure in which the thickness of the Ag plated layer 120 is 5 μm or more as shown in FIG. 9B, there has been a drawback in that production costs increase because Ag (silver) itself is relatively expensive.

In addition, in the structure in which a corrosion inhibitor, for example, is applied to the surface 121*b* of the Ag plated layer 121 as shown in FIG. 9C, when applied to a terminal, insertion-extraction force increases due to the viscosity of a corrosion inhibitor, and there has been a problem in that this structure cannot be applied to a small terminal for which relatively small insertion-extraction force is required.

The present invention is made in view of the above-mentioned problems, and an object thereof is to provide a plated material and a terminal, in which the deposition of a corrosion product can be suppressed at relatively low costs and contact resistance and insertion-extraction force can be reduced.

A plated material according to a first aspect of the present invention includes a base metal made from Cu or an alloy containing Cu as a main raw material, an underlayer made from Ni formed on the base metal, and an Ag plated layer formed on the underlayer. A thickness of the underlayer is 0.1 μm to 1.0 μm. A thickness of the Ag plated layer is 1.0 μm or less.

The Ag plated layer may have a surface Vickers hardness Hv of 65 or more, and may have a contact resistance of 1 mΩ or less when a contact load of 1 N is applied after the plated material is left to stand about for a few days under a $SO_2$ atmosphere.

A terminal according to a second aspect of the present invention includes the plated material according to the first aspect is used at least in a sliding portion.

A thickness of the base metal of the terminal made from Cu or an alloy containing Cu as a main raw material may be 0.15 mm to 0.8 mm.

According to the aspects of the present invention provides a plated material and a terminal, in which the deposition of a corrosion product can be suppressed at relatively low costs and contact resistance and insertion-extraction force can be reduced.

BRIEF DESCRIPTION OF DRAWINGS

FIG. 3 is a table showing electric potential difference in the combinations of Ni, Cu and Ag;

FIG. 8 is a table showing the ionization tendency of elements; and

DETAILED DESCRIPTION

Embodiment

By reference to FIGS. 1 to 3, the embodiment of the present invention will be described.

[Schematic Structure of Plated Material]

Figure 1:
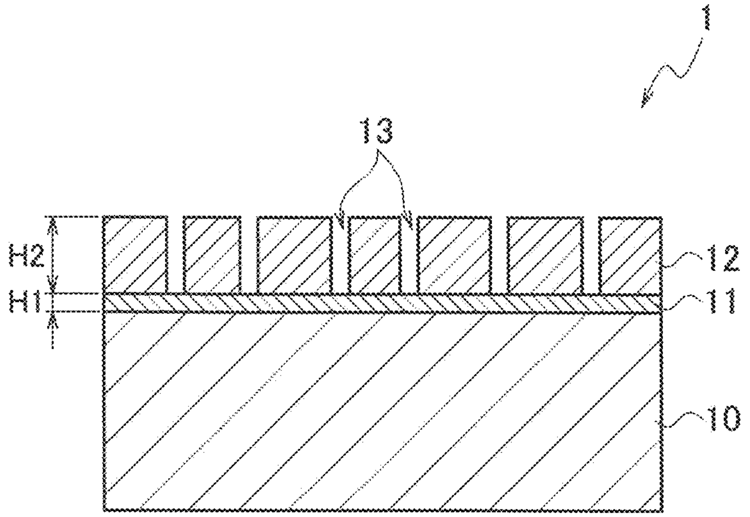
FIG. 1 is a schematic cross section showing a structure of a plated material according to an embodiment.
Figure 2:
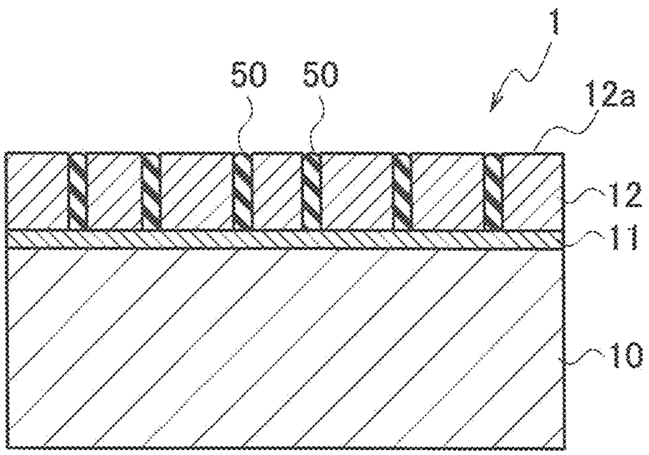
FIG. 2 is a schematic cross section showing the state of deposition of a corrosion product in a plated material according to an embodiment.

FIG. 1 is a schematic cross section showing a structure of a plated material 1 according to an embodiment, and FIG. 2 is a schematic cross section showing the state of deposition of a corrosion product 50 in a plated material 1.

FIG. 3 is a table showing electric potential difference in the combinations of Ni, Cu and Ag.

As shown in FIG. 1, in the plated material 1 according to the embodiment, a underlayer 11 made from Ni (nickel) and an Ag plated layer 12 are successively formed on a base metal 10 made from Cu (copper) or an alloy containing Cu as a main raw material.

The thickness (H1) of the underlayer 11 is 0.1 μm to 1.0 μm, and the thickness (H2) of the Ag plated layer 12 is 1.0 μm or less.

It is desired that the Ag plated layer 12 have a surface Vickers hardness Hv of 65 or more, and a contact resistance of 1 mΩ or less when a contact load of 1 N is applied after the plated material is left to stand about for a few days under a $SO_2$ atmosphere. The specific evaluation results of examples will be described below.

By reference to the table showing electric potential difference in the combinations of Ni, Cu and Ag in FIG. 3, it is found that the electric potential difference of Ag—Ni is the largest, 1.057 V, in the combinations of other elements.

Therefore, a corrosion product of Ni ($NiO_3S$) is generated first between the Ag plated layer 12 and the Ni underlayer 11 corresponding to the combination of Ag—Ni.

In the plated material 1 according to the embodiment, the thickness (H1) of the underlayer 11 is purposely made thin, 0.1 μm to 1.0 μm, and thus the amount of Ni used for the generation of the corrosion product ($NiO_3S$) can be kept low.

In the plated material 1 according to the embodiment, the deposition of the corrosion product can be suppressed by such mechanism. Therefore, as shown in FIG. 2, even when the corrosion product ($NiO_3S$) 50 is generated, the amount thereof reaching the surface 12*a* of the Ag plated layer 12 can be reduced.

Because of this, when the plated material 1 according to the embodiment is applied to a terminal, a situation in which the contact surface made of the surface 12*a* of the Ag plated layer 12 is covered with the corrosion product 50 and reduced can be suppressed, and good contact resistance can be maintained.

In addition, in the plated material 1 according to the embodiment, the Ag plated layer is not required to be thick, 5 μm or more, unlike conventional ones, and the amount of Ag (silver) used for plating can be reduced, and production costs can be lowered.

In addition, in the plated material 1 according to the embodiment, it is not required that a corrosion inhibitor with viscosity and an antitarnish agent be applied to surfaces, and thus the insertion-extraction force can be reduced, and the plated material can be also applied to a small terminal.

[Examples of Plated Material]

By reference to FIG. 4 to FIG. 6, examples (First Example to Third Example) of a plated material 1 according to the embodiment will be described.

Figure 4:
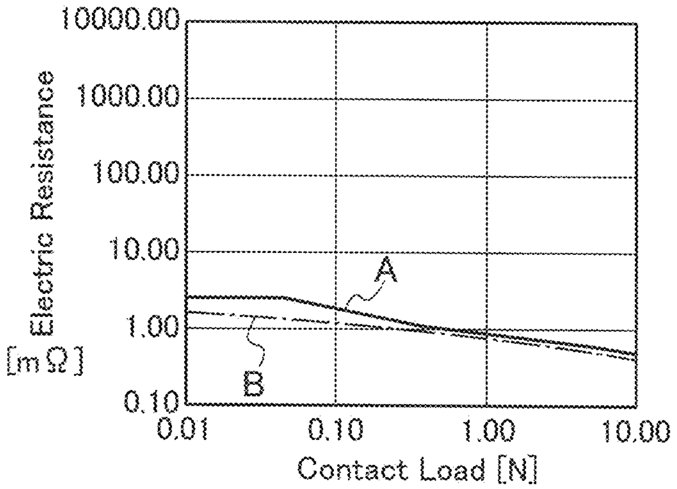
FIG. 4 is a table showing the evaluation results and appearance of a plated material according to First Example.
Figure 4:
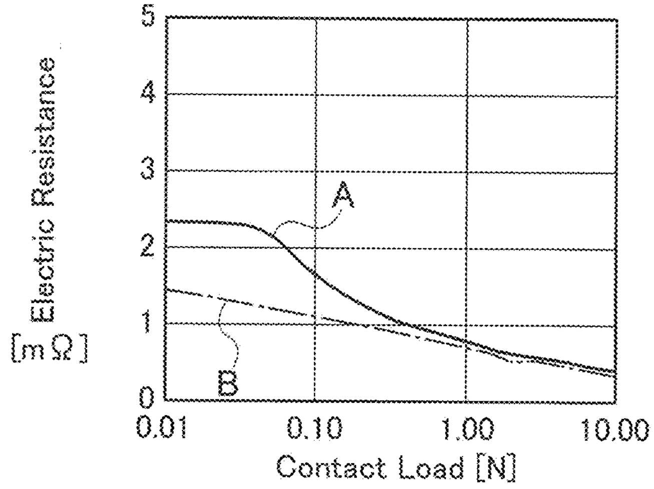
Figure 4:
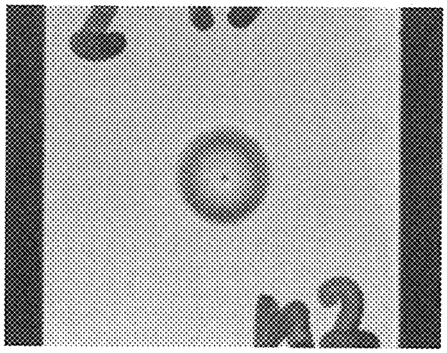
Figure 5:
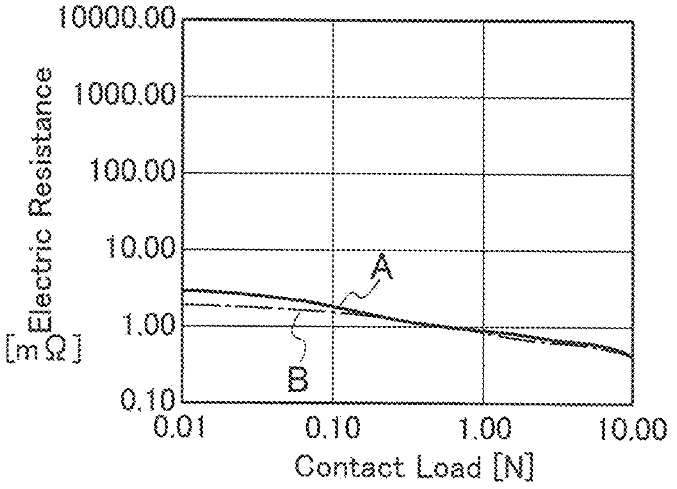
FIG. 5 is a table showing the evaluation results and appearance of a plated material according to Second Example.
Figure 5:
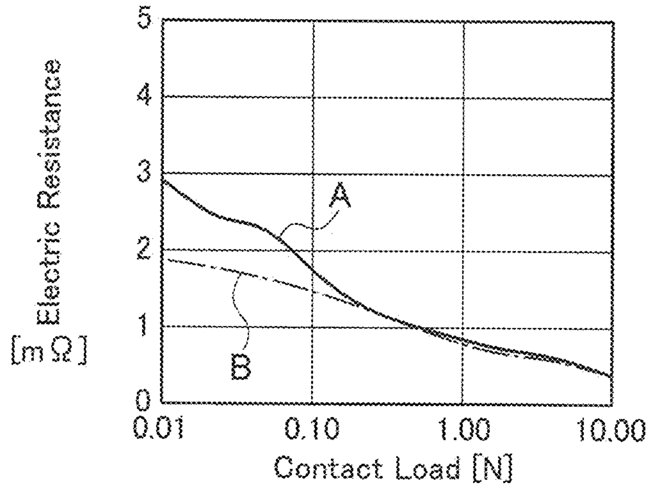
Figure 5:
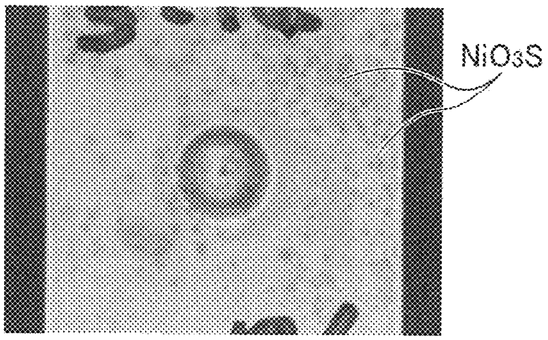
Figure 6:
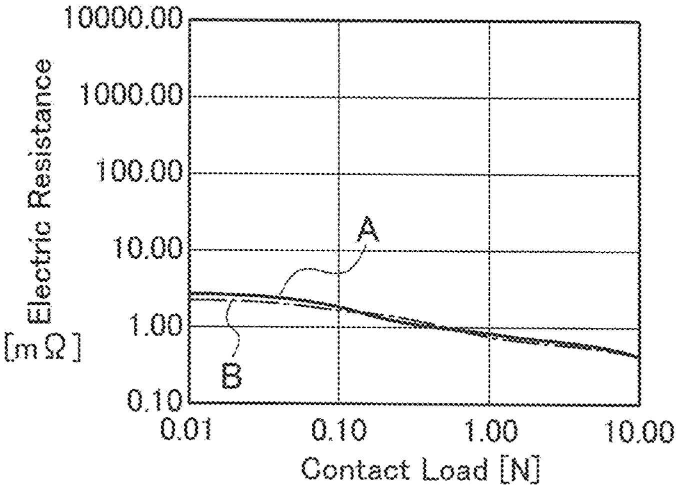
FIG. 6 is a table showing the evaluation results and appearance of a plated material according to Third Example.
Figure 6:
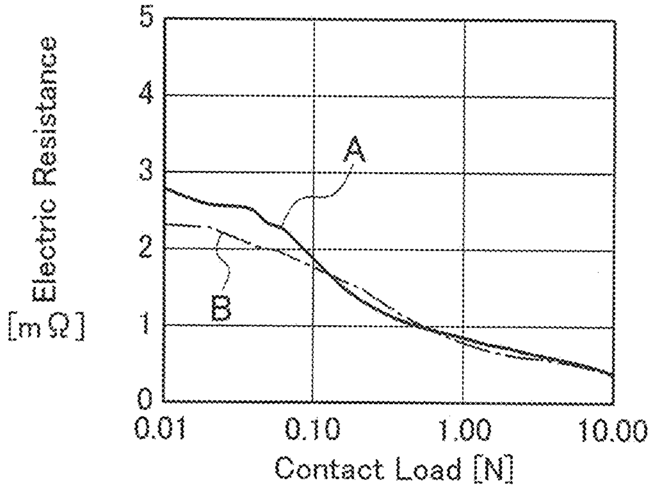
Figure 6:
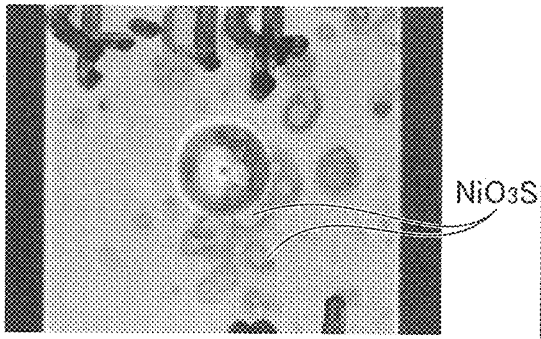

FIG. 4 to FIG. 6 are tables showing the evaluation results and appearance of the plated materials according to First Example to Third Example, respectively.

As common evaluation conditions, a contact load of 1 N was applied after the plated material was left to stand about for a few days under a $SO_2$ atmosphere.

The evaluation items are contact resistance (mΩ) in the initial state (the plot line B in graphs in each table) and in the final state (the plot line A in graphs in each table), and the observation of the state of the corrosion product by appearance.

The graphs in each table are about load-resistance characteristics, and show a relationship between contact resistance (mΩ) and contact load (N) on a log scale and a linear scale.

The surface Vickers hardness Hv of the Ag plated layer (outer plating) 12, which shows Ag purity, is 65, and the thickness of the Ag plated layer 12 (H2) is 1 μm.

First Example

First example shown in FIG. 4 is a case where the thickness of the Ni underlayer is 0.1 μm.

As can be seen from the log scale and the linear scale, the contact resistance is 1 mΩ or less when the contact load is 1 N.

As can be seen from the image showing its appearance, a corrosion product which can be confirmed visually cannot be observed.

An object which can be seen at almost center of the image is a projection made by embossing (the same applies to other examples). In addition, other objects in the image are impurities.

Second Example

Second example shown in FIG. 5 is a case where the thickness of the Ni underlayer 11 is 0.5 μm.

As can be seen from the log scale and the linear scale, the contact resistance is 1 mΩ or less when the contact load is 1 N.

As can be seen from the image showing its appearance, relatively small corrosion products ($NiO_3S$) are observed; however, it can be said that the amount is extremely small compared to that in Comparative Example (FIG. 7) described below.

Third Example

Third example shown in FIG. 6 is a case where the thickness of the Ni underlayer 11 is 1 μm.

As can be seen from the log scale and the linear scale, the contact resistance is 1 mΩ or less when the contact load is 1 N.

As can be seen from the image showing its appearance, several corrosion products ($NiO_3S$) are observed; however, similar to Second Example, it can be said that the amount thereof is extremely small compared to that in Comparative Example (FIG. 7) described below.

[Comparative Example of Plated Material]

Figure 7:
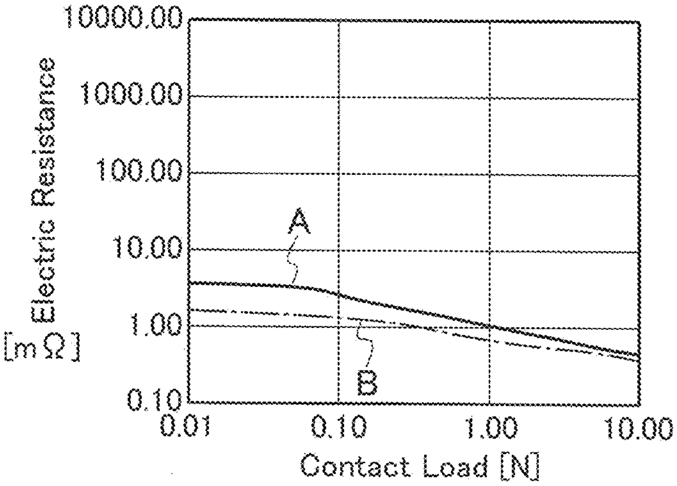
FIG. 7 is a table showing the evaluation results and appearance of a plated material according to Comparative Example.
Figure 7:
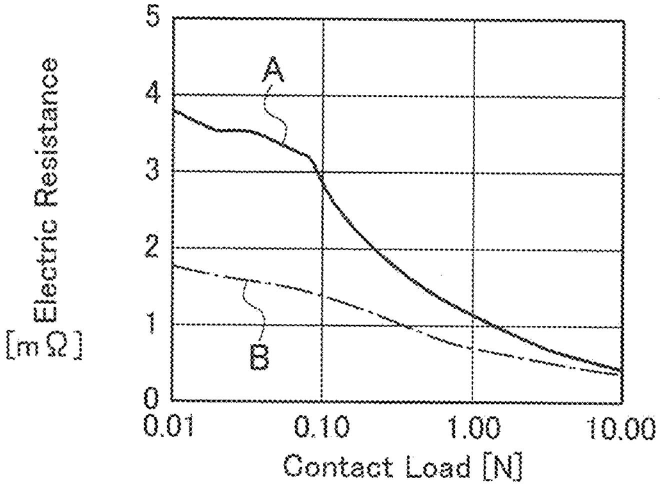
Figure 7:
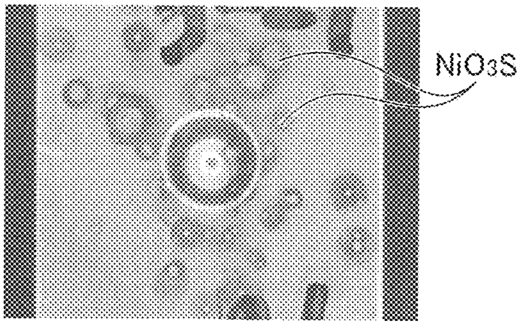
Figure 9A:
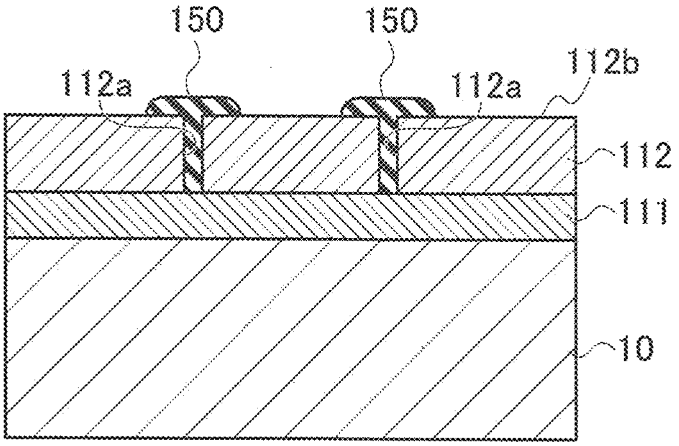
FIGS. 9A to 9C are schematic cross sections showing the structures of plated materials according to conventional techniques.
Figure 9B:
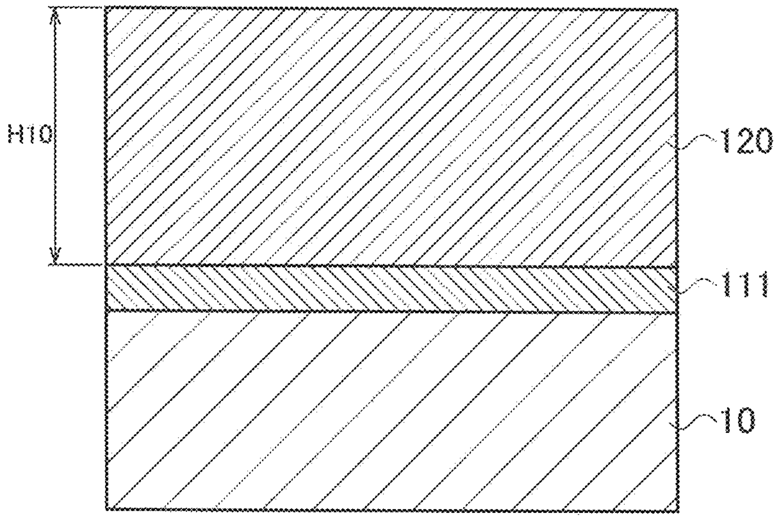
Figure 9C:
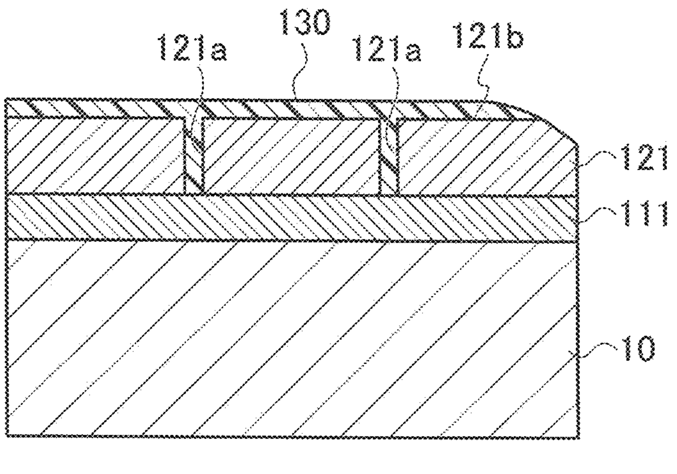

By reference to FIG. 7, the plated material according to Comparative Example will be briefly described.

The evaluation conditions and the like are the same as in examples described above.

Comparative Example shown in FIG. 7 is a case where the thickness of the Ni underlayer 11 is 3 μm.

As shown in the graphs in FIG. 7, contact resistance cannot be maintained to 1 mΩ or less when the contact load is IN.

As can be seen from the image showing its appearance, a large number of big and small corrosion products ($NiO_3S$) are observed in the plated material according to Comparative Example. Therefore, when the plated material according to Comparative Example is used for a terminal, there is a risk that a part of the terminal surface is covered with the corrosion products, and in this case, there is a difficulty in that the contact resistance of the terminal increases.

As described above, the plated materials according to First Example to Third Example show a contact resistance of 1 mΩ or less when a contact load of 1 N is applied after the plated materials are left to stand about for a few days under a $SO_2$ atmosphere, and when applied to a terminal, good contact resistance can be secured.

Furthermore, in the plated materials according to First Example to Third Example, the deposition of the corrosion product ($NiO_3S$) can be also kept to a relatively small amount.

Therefore, in the case where the plated materials according to First Example to Third Example are applied to a terminal, even when the corrosion product ($NiO_3S$) 50 is generated as shown in FIG. 2 above, the amount thereof reaching the surface **12*a* of the Ag plated layer 12** can be reduced.

Because of this, a situation in which the contact surface made of the surface **12*a* of the Ag plated layer 12 is covered with the corrosion product 50** and reduced can be suppressed, and good contact resistance can be maintained in the terminal.

[Application to Terminals]

The plated material 1 according to the embodiment shown in First Example to Third Example can be widely applied to, for example, terminals for vehicles.

At this time, the plated material 1 according to the embodiment can be used at least in the sliding portion of the terminals. Because of this, good contact resistance can be maintained in the terminals.

When producing a terminal, the thickness of the base metal 10 made from Cu or an alloy containing Cu as a main raw material can be 0.15 mm to 0.8 mm.

The plated material of the present invention was described based on the embodiment shown in figures. It should be noted however that the present invention is not limited thereto, and the structure of each part can be substituted with an optional structure having the same function.

What is claimed is:

1. A plated material comprising;

a base metal made from Cu or an alloy containing Cu as a main raw material;

an underlayer made from Ni formed on the base metal; and an Ag plated layer directly formed on the underlayer, wherein a thickness of the underlayer is 0.1 μm to 1.0 μm, a thickness of the Ag plated layer is 1.0 μm or less, and the Ag plated layer is exposed, wherein the Ag plated layer has a surface Vickers hardness Hv of 65 or more, and has a contact resistance of 1 mΩ or less when a contact load of 1 N is applied after the plated material is left to stand for a few days in a $SO_2$ atmosphere.

2. A terminal, wherein the plated material according to claim 1 is used at least in a sliding portion.

3. The terminal according to claim 2, wherein a thickness of the base metal made from Cu or an alloy containing Cu as a main raw material is 0.15 mm to 0.8 mm.

4. The plated material according to claim 1, wherein the Ag plated layer comprises a plurality of interstices.

5. The plated material according to claim 4, wherein the interstices extend from an exposed surface of the Ag plated layer to the underlayer.

6. The plated material according to claim 1, wherein the Ag plated layer consists of Ag.

* * * * *